(12) United States Patent
Legendre

(10) Patent No.: US 10,415,951 B2
(45) Date of Patent: Sep. 17, 2019

(54) SYSTEM AND METHODS FOR MEASURING BOREHOLE CALIPER IN OIL-BASED MUD

(71) Applicant: Schlumberger Technology Corporation, Sugar Land, TX (US)

(72) Inventor: Emmanuel Legendre, Sevres (FR)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 1138 days.

(21) Appl. No.: 14/366,682

(22) PCT Filed: Dec. 20, 2012

(86) PCT No.: PCT/US2012/070863
§ 371 (c)(1),
(2) Date: Jun. 19, 2014

(87) PCT Pub. No.: WO2013/096576
PCT Pub. Date: Jun. 27, 2013

(65) Prior Publication Data
US 2015/0012217 A1   Jan. 8, 2015

(30) Foreign Application Priority Data
Dec. 23, 2011   (EP) .................................. 11290610

(51) Int. Cl.
*G01B 7/14* (2006.01)
*E21B 47/08* (2012.01)
(Continued)

(52) U.S. Cl.
CPC ............ *G01B 7/14* (2013.01); *E21B 47/08* (2013.01); *E21B 47/082* (2013.01); *E21B 47/10* (2013.01);
(Continued)

(58) Field of Classification Search
None
See application file for complete search history.

(56) References Cited

U.S. PATENT DOCUMENTS 3,973,188 A * 8/1976 Attali .................. G01V 3/24
324/374
4,412,180 A * 10/1983 Desbrandes .......... E21B 47/026
324/373
(Continued)

FOREIGN PATENT DOCUMENTS

EP   2182393   5/2010
GB   2094473   9/1982
(Continued)

OTHER PUBLICATIONS

International Search Report and Written Opinion issued in International Patent application PCT/US2012/070863, dated Feb. 25, 2013. 12 pages.

(Continued)

*Primary Examiner* — John E Breene
*Assistant Examiner* — Brandon J Becker

(57) ABSTRACT

Systems and methods for estimating standoff and/or caliper in a wellbore for oil-based mud drilling are provided. The systems include a sensor having a primary electrode and at least two secondary electrodes, and an electronics subsystem having a controller and a processor for driving the system and correlating current measurements with standoff and/or caliper. The electrodes are positioned relative to one another such that there is a distinct flow of current between the primary electrode and each secondary electrode. In operation, a single excitation frequency is applied to the primary electrode and a simultaneous measurement of current flowing between the primary electrode and each secondary electrode is obtained. Standoff is estimated from the mea- (Continued)

surements. The estimations can be independent of formation properties when an appropriate excitation frequency is used.

12 Claims, 5 Drawing Sheets

(51) Int. Cl.
    *E21B 47/12*     (2012.01)
    *G01B 7/13*     (2006.01)
    *E21B 47/10*     (2012.01)

(52) U.S. Cl.
    CPC ............ *E21B 47/12* (2013.01); *E21B 47/124* (2013.01); *G01B 7/13* (2013.01)

(56) References Cited

U.S. PATENT DOCUMENTS

| | | | | |
|---|---|---|---|---|
| 4,675,610 A * | 6/1987 | Chapman | ............... | G01V 3/20 324/347 |
| 4,692,707 A * | 9/1987 | Locke | ............... | G01V 3/24 324/347 |
| 4,692,908 A * | 9/1987 | Ekstrom | ............... | E21B 47/082 324/355 |
| 4,703,279 A * | 10/1987 | Chapman | ............... | G01V 3/38 324/347 |
| 5,426,368 A | 6/1995 | Benimeli et al. | | |
| 5,899,958 A | 5/1999 | Dowell et al. | | |
| 7,323,868 B2 * | 1/2008 | Mishkevich | ............... | G01B 7/14 324/207.11 |
| 7,689,363 B2 | 3/2010 | Itskovich et al. | | |
| 8,138,774 B2 * | 3/2012 | Wilbraham | ............... | G01B 7/13 324/522 |
| 2005/0133262 A1 * | 6/2005 | Chen | ............... | G01V 3/24 175/40 |
| 2009/0166035 A1 | 7/2009 | Almaguer | | |
| 2010/0019771 A1 * | 1/2010 | Gold | ............... | G01V 3/24 324/355 |

FOREIGN PATENT DOCUMENTS

| | | |
|---|---|---|
| GB | 2355307 | 4/2001 |
| GB | 2364079 | 1/2002 |
| GB | 2414081 | 11/2005 |
| WO | WO2010049107 | 5/2010 |

OTHER PUBLICATIONS

International Preliminary Report on Patentability issue in International Patent application PCT/US2012/070863, dated Jul. 3, 2014. 8 pages.
Extended Search Report 62 EPC issued in European patent application 11290610.2 dated Jun. 12, 2012. 6 pages.
Examination Report 94(3) EPC issued in European patent application 11290610.2 dated Jun. 28, 2017. 6 pages.
Office Action 29614 issued in Mexican patent application MX/a/2014/007771 dated Apr. 7, 2017. 3 pages.

* cited by examiner

SYSTEM AND METHODS FOR MEASURING BOREHOLE CALIPER IN OIL-BASED MUD

FIELD

The present disclosure relates to drilling wellbores in subterranean formations. The present disclosure also relates to systems and methods for measuring standoff and borehole caliper during drilling with oil-based mud.

BACKGROUND

Oil or gas located in a subterranean formation can be recovered by drilling a wellbore into the formation. Accurate knowledge of borehole caliper can be advantageous in the drilling process. For example, in the wellbore completion process, knowledge of borehole caliper assists in determining accurate cement volume and for placing casing hardware such as centralizers. Knowledge of borehole caliper during drilling also gives access to information about how well the drilling process is controlled. For example, appearances of break-outs on some portion of the borehole wall are indicative of inappropriate borehole stress management. Another example is observation of a cork-screw shaped borehole that indicates non-optimal drilling. Borehole caliper knowledge also allows to better correct measurements affected by it such as electromagnetic imaging, electromagnetic resistivity measurements (e.g. propagation-style measurements), and density measurements among others.

In oil-based muds, micro-imagers are operated at high frequencies (100 s of kHz to 10 s of MHz), making the estimation of caliper complicated by the influence of formation resistivity and formation dielectric effects. The use of multiple frequencies has been proposed to compensate for standoff effects with the end goal of getting robust formation imagery. But the dielectric dispersion at high frequencies of oil-based muds and formations complicates greatly the applicability of such a method. Another approach is to put up several devices at different distances to the borehole wall. After estimation of formation properties, an estimation of mud properties and standoff is devised. This assumes that the tool is positioned in the borehole at the same location during the two times for which the two sensors are facing the same position on the borehole wall. This is usually not the case because of drilling dynamics, and this makes the proposed method very sensitive to tool eccentering and drilling dynamics.

SUMMARY

The present disclosure relates to systems and methods for estimating standoff and borehole caliper. In general, the system comprises a sensor including at least three electrodes and a processor for controlling the system and for estimating standoff and/or borehole caliper from sensor measurements. In general, the method comprises exciting one of the sensor electrodes (the "primary" electrode) with a single frequency while maintaining that sensor electrode at one potential and the other, secondary sensor electrodes at another potential; simultaneously obtaining measurements of current flow between the primary and each of the secondary sensor electrodes; and, estimating standoff and/or borehole caliper from the measurements.

More specifically, in some embodiments, the system includes a downhole tool that is positionable in a borehole, at least one sensor disposed on the tool, wherein the sensor has at least three electrodes (a primary electrode and at least two secondary electrodes) arranged to provide a distinct current flow measurement between the primary electrode and each of the secondary electrodes when the system is in operation, and an electronics subsystem comprising a controller and a processor and containing machine-readable instructions for: exciting the primary electrode with a single frequency; maintaining the primary electrode at a first potential and the secondary electrodes at a second potential; simultaneously measuring current flow through each secondary electrode; and, estimating standoff and/or caliper from the current flow measurements. In further embodiments, the electrodes are arranged in a concentric pattern, with the primary electrode positioned in the center of the pattern. In other embodiments, the electrodes are arranged in a non-concentric pattern. In some embodiments, wherein the electrodes are arranged in a non-concentric pattern, the primary electrode is positioned at one end of the pattern. In some embodiments, the system comprises at least two sensors. In some embodiments, the system has a first sensor and a second sensor that are positioned 180 degrees apart from each other at the same height on the downhole tool.

With respect to the methods, in some embodiments, estimating standoff and/or borehole caliper involves positioning a downhole tool in a borehole, wherein the downhole tool has at least one sensor attached to it, and the sensor includes at least one primary electrode and two or more secondary electrodes; applying a single excitation frequency to the primary electrode while maintaining the primary electrode at one potential and the secondary electrodes at another potential; simultaneously measuring current flow between the primary electrode and each of the secondary electrodes; and estimating standoff and/or caliper from the measurements. In some embodiments, the single excitation frequency is less than 100 kHz. In some embodiments, the single excitation frequency is chosen to alleviate or eliminate interference from drilling mud and formation electrical properties. In some embodiments, the method comprises estimating caliper from measurements of current flow in a first sensor and a second sensor that are positioned 180 degrees apart from each other and at the same height on the borehole tool. In some embodiments, the method comprises estimating standoff by calculating a value $m_a$, and correlating the value $m_a$ with the standoff using a predetermined relationship, wherein the value $m_a$ is calculated according to the formula:

$$ma = \left| \frac{I1 + I2 + \ldots In}{Ia} \right|$$

and wherein "a" identifies the secondary electrode but is greater than 1 (i.e. a can be 2, 3, . . . n).

In some embodiments, $m_a$ is calculated for every secondary electrode greater than 1 (i.e. a>1), and each $m_a$ is correlated with standoff using a predetermined relationship.

The identified embodiments are exemplary only and are therefore non-limiting. The details of one or more non-limiting embodiments of the invention are set forth in the accompanying drawings and the descriptions below. Other embodiments of the invention should be apparent to those of ordinary skill in the art after consideration of the present disclosure.

DETAILED DESCRIPTION

Figure 1:
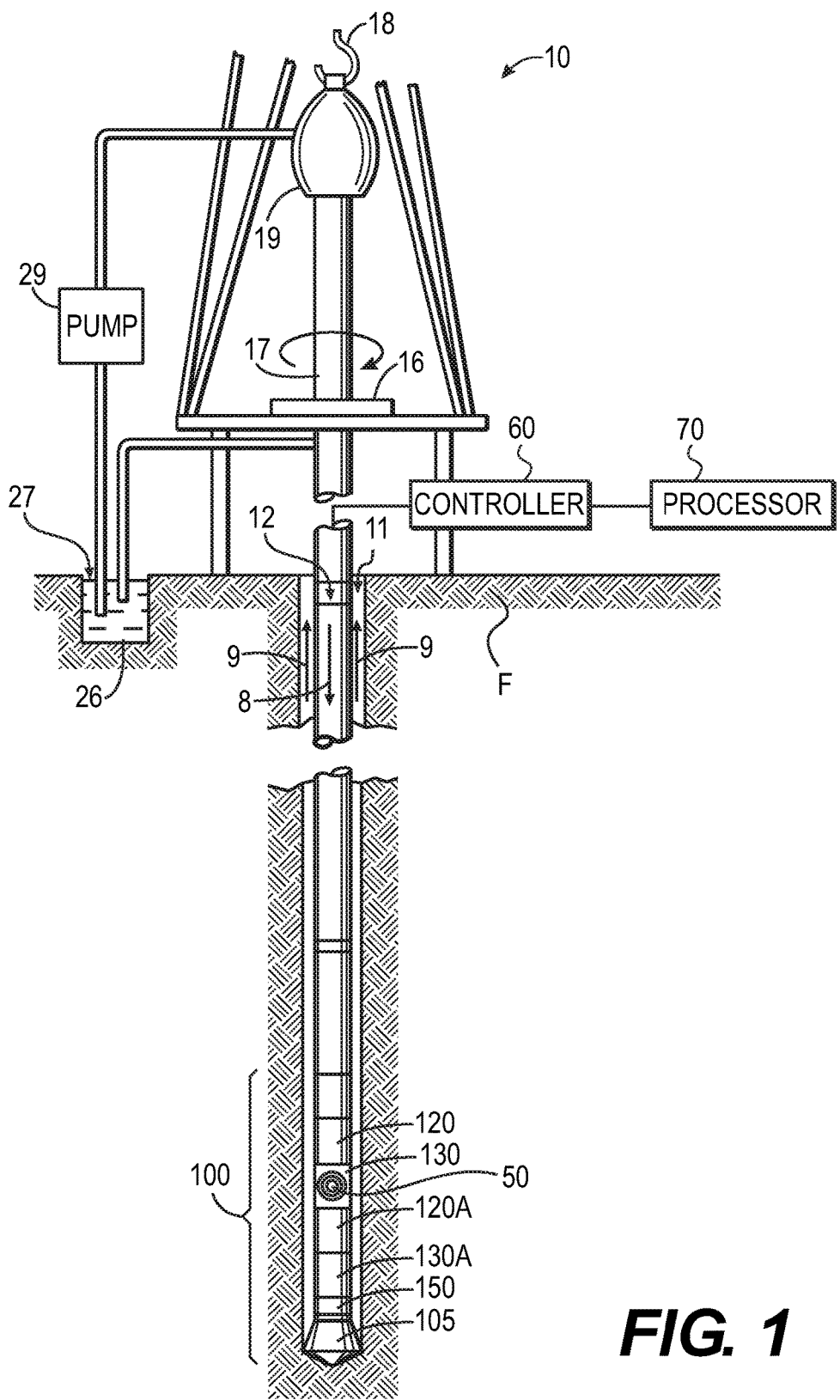
FIG. 1 is a partial schematic representation of an exemplary apparatus for logging while drilling that is compatible with the systems and methods of this disclosure.

Unless defined otherwise, all technical and scientific terms used herein have the same meaning as is commonly understood by one of ordinary skill in the art to which this disclosure belongs. In the event that there is a plurality of definitions for a term herein, those in this section prevail unless stated otherwise.

Where ever the phrases "for example," "such as," "including" and the like are used herein, the phrase "and without limitation" is understood to follow unless explicitly stated otherwise. Therefore, "for example a mud turbine generator" means "for example and without limitation a mud turbine generator."

The terms "comprising" and "including" (and similarly "comprises" and "includes") are used interchangeably and mean the same thing. Specifically, each of the terms is defined consistent with the common United States patent law definition of "comprising" and is therefore interpreted to be an open term meaning "at least the following" and also interpreted not to exclude additional features, limitations, aspects, etc.

The term "about" is meant to account for variations due to experimental error and/or measurement error or limitations.

The terms "wellbore" and "borehole" are used interchangeably.

The phrases "bottom hole assembly" and "downhole tool" are used interchangeably.

The terms "distinct" or "unique" when used to modify the current flowing between the primary and each secondary electrode (for example when used as follows: the electrodes are arranged to provide a distinct current flow measurement between the primary electrode and each of the secondary electrodes) means that the current flowing at any given secondary electrode in a set of electrodes is different from the current flowing at another secondary electrode in a set. For example, if there are three secondary electrodes, the current flowing between the primary electrode and the first secondary electrode is $I_1$, the current flowing between the primary electrode and the second secondary electrode is $I_2$, the current flowing between the primary electrode and the third secondary electrode is $I_3$, and $I_1$, $I_2$ and $I_3$ are all different.

The term "sensor", when used in reference to the systems and methods of this disclosure, means a set of at least three electrodes. For clarity, although many of the examples herein illustrate a circular-shaped "button" sensor made up of concentric electrodes, the sensor does not need to be a distinct component but is simply a set of at least three electrodes.

The term "electrode," when used in reference to the "sensors" suitable for use with the systems and methods disclosed herein, can be an independent or discrete component, or it can be any existing feature of the drilling apparatus that can operate as an electrode, for example, a collar of the borehole assembly. In other words, sensors suitable for use with the systems and methods according to this disclosure comprise at least three electrodes, and the electrodes can be any object that can function as an electrode, even if already a part of the drilling apparatus being used for a different or additional purpose.

"Measurement While Drilling" ("MWD") can refer to devices for measuring downhole conditions including the movement and location of the drilling assembly contemporaneously with the drilling of the well. "Logging While Drilling" ("LWD") can refer to devices concentrating more on the measurement of formation parameters. While distinctions may exist between these terms, they are also often used interchangeably. For purposes of this disclosure MWD and LWD are used interchangeably and have the same meaning. That is, both terms are understood as related to the collection of downhole information generally, to include, for example, both the collection of information relating to the movement and position of the drilling assembly and the collection of formation parameters.

FIG. 1 illustrates an embodiment of a wellsite system compatible with the disclosed systems and methods. A land-based platform and derrick assembly 10 are positioned over a wellbore 11 penetrating a subsurface formation F. In the illustrated embodiment, the wellbore 11 is formed by rotary drilling in a manner that is known in the art. Those of ordinary skill in the art given the benefit of this disclosure will appreciate, however, that the subject matter of this disclosure also finds application in directional drilling applications as well as rotary drilling, and is not limited to land-based rigs. In addition, although a logging while drilling apparatus is illustrated, the subject matter of this disclosure is also applicable to wireline drilling.

A drill string 12 is suspended within the wellbore 11 and includes a drill bit 105 at its lower end. The drill string 12 is rotated by a rotary table 16, energized by means not shown, which engages a kelly 17 at the upper end of the drill string. The drill string 12 is suspended from a hook 18, attached to a travelling block (also not shown), through the kelly 17 and a rotary swivel 19 which permits rotation of the drill string 12 relative to the hook 18.

Drilling fluid or mud 26 is stored in a pit 27 formed at the well site. A pump 29 delivers the drilling fluid 26 to the interior of the drill string 12 via a port in the swivel 19, inducing the drilling fluid to flow downwardly through the drill string 12 as indicated by the directional arrow 8. The drilling fluid exits the drill string 12 via ports in the drill bit 105, and then circulates upwardly through the region between the outside of the drill string 12 and the wall of the wellbore, called the annulus, as indicated by the direction arrows 9. In this manner, the drilling fluid lubricates the drill bit 105 and carries formation cuttings up to the surface as it is returned to the pit 27 for recirculation. The systems and methods disclosed herein are particularly applicable to oil-based mud ("OBM") drilling systems.

The drill string 12 further includes a bottomhole assembly ("BHA"), generally referred to as 100, near the drill bit 105 (for example, within several drill collar lengths from the drill bit). The BHA 100 includes capabilities for measuring, processing, and storing information, as well as communicating with the surface. The BHA 100 thus may include, among other things, one or more logging-while-drilling ("LWD") modules 120, 120A and/or one or more measuring-while-drilling ("MWD") modules 130, 130A. The BHA 100 may also include a roto-steerable system and motor 150.

The LWD modules 120, 120A can be housed in a special type of drill collar, as is known in the art, and can contain one or more types of logging tools. The LWD modules 120, 120A may include capabilities for measuring, processing, and storing information, as well as for communicating with surface equipment.

The MWD modules 130, 130A can also be housed in a special type of drill collar, as is known in the art, and can contain, for example, one or more measuring devices or additional components as is known in the art. For example, MWD module 130 is shown to include a concentric, three-electrode sensor 50 useful for making measurements from which standoff and/or borehole caliper can be determined as disclosed herein. Although only a single sensor 50 is shown, it is understood that multiple sensors can be used. For example, in some embodiments a second similar sensor can be disposed on MWD module 130 at a position that is 180 degrees from the sensor 50, and at the same depth as the sensor 50. As another example, additionally or in alternatively, one or more sensors 50 may be disposed at different heights on the MWD module 130. As a further example, alternatively, or in addition, one or more sensors 50 can be positioned on an LWD module 120, 120A. The MWD modules 130, 130A may also include an apparatus for generating electrical power to the downhole system. Such an electrical generator may include, for example, a mud turbine generator powered by the flow of the drilling fluid, but other power and/or battery systems may be employed additionally or alternatively.

The well-site system is also shown to include an electronics subsystem comprising a controller 60 and a processor 70, which together can serve multiple functions. For example the controller 60 and processor 70 may be used to power and operate sensors, including sensor 50, and to receive and analyze data collected from the sensors, including sensor 50. The controller and processor for the sensor 50 need not be on the surface as shown but may be configured in any way known in the art. For example, alternatively, or in addition, as is known in the art, the controller and/or processor for the sensor 50 may be part of the MWD (or LWD) modules on which the sensor 50 is positioned or may be on-board the sensor 50 itself. In the methods and systems according to this disclosure, the electronics subsystem (whether located on the surface or sub-surface on or within the tool or some combination thereof) includes machine-readable instructions for: exciting the primary electrode of a sensor with a single frequency; maintaining the primary electrode at a first potential and the secondary electrodes of the sensor at a second potential; simultaneously measuring current flow through each secondary electrode; and, estimating standoff and/or caliper from the current flow measurements.

Figure 2:
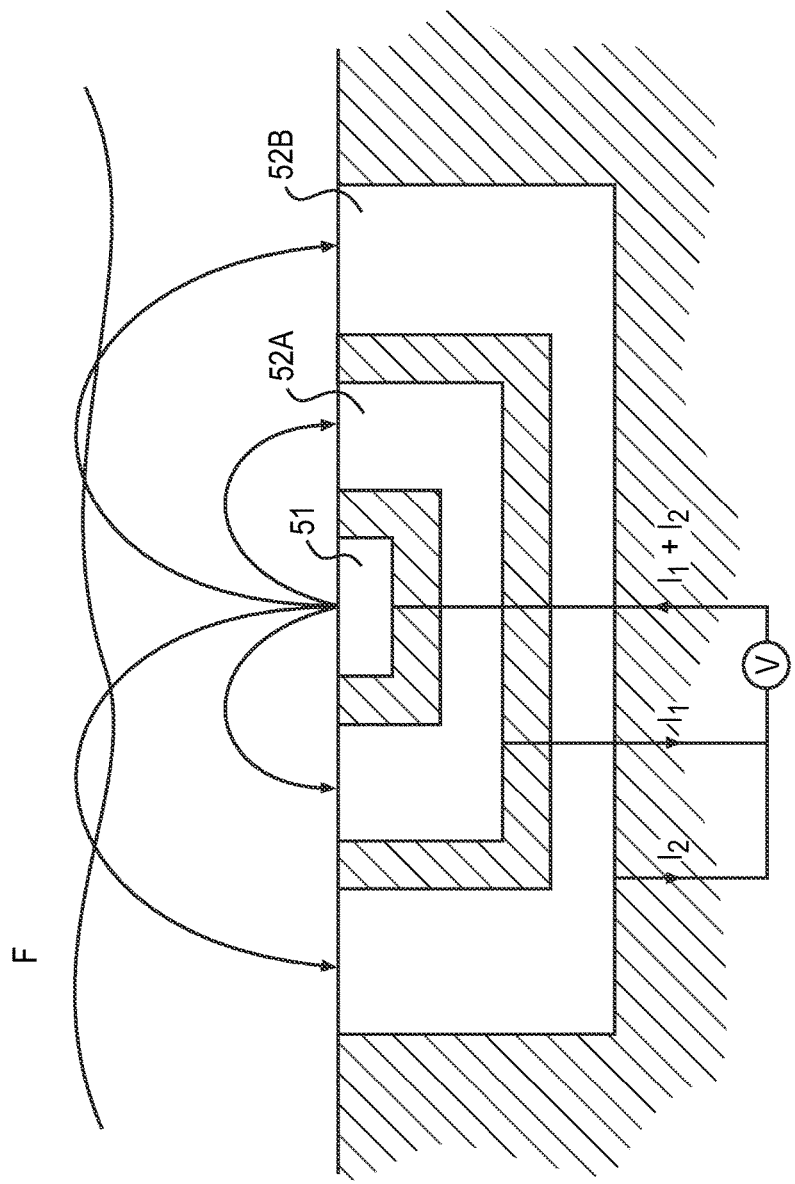
FIG. 2 is schematic cut-away side view of an embodiment of a three-electrode sensor useful in the systems and methods of this disclosure.

Considering the sensor 50 in greater detail, in the embodiment shown in FIG. 2, the sensor 50 includes a plurality of electrodes, particularly a primary electrode 51 and two secondary electrodes 52a, 52b. The electrodes are arranged in a concentric pattern, with the primary electrode 51 positioned in the center of the pattern. In the embodiment shown, although not drawn to scale, the primary or central electrode 51 can have a radius of about ¼ inch, and the secondary electrodes 52a, 52b can have a radius of about ½ inch and ¾ inch respectively. A person of skill will appreciate from reading this disclosure that the size of each electrode can vary, yet still be effective in the systems and methods disclosed. In general, the size of the electrode impacts the depth of investigation, with smaller electrode sizes providing shallower measurements. Thus the size of electrode may be chosen depending on the anticipated size of standoff, with larger electrodes used for larger standoff.

Figure 6:
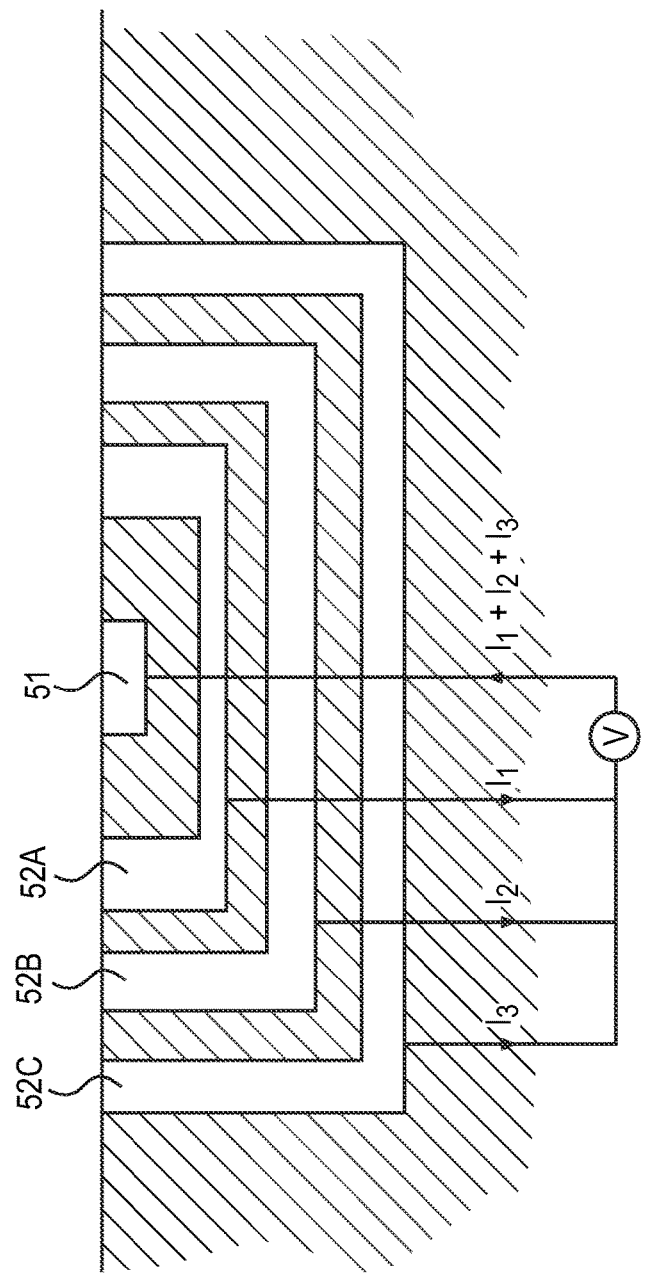
FIG. 6 is a schematic representation of a cut-away side view of an embodiment of a four electrode sensor compatible with the systems and methods disclosed herein.

In some embodiments, additional secondary electrodes may optionally be used. As an example, and as shown in FIG. 6, the sensor may include four electrodes, a primary electrode 51 and three secondary electrodes 52a, 52b, 52c. Similar to the embodiment illustrated in FIG. 2, the electrodes in the embodiment of FIG. 6 are arranged in a concentric pattern, with the primary electrode being positioned in the center of the pattern. In general, the number of electrodes correlates to the range of standoff estimation, with more electrodes corresponding to a wider range of standoff estimation.

Figure 5:
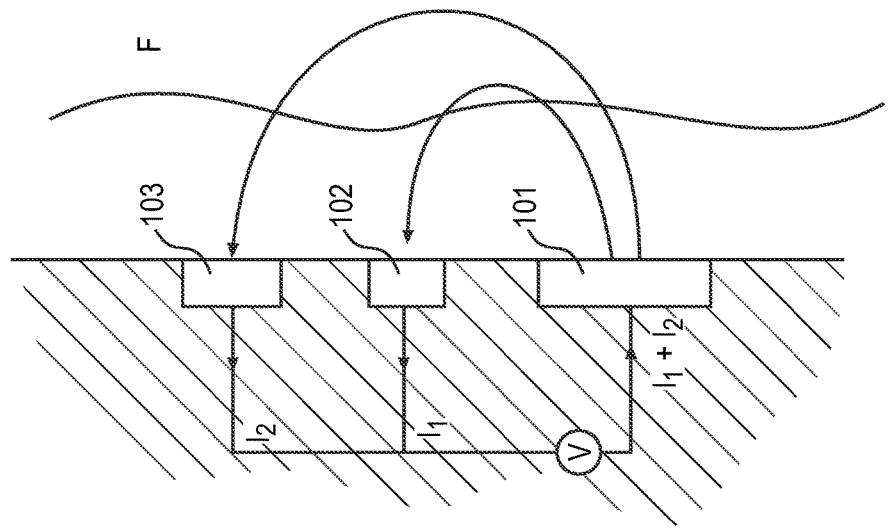
FIG. 5 is a schematic representation of a cut-away side view of the embodiment of FIG. 4.
Figure 4:
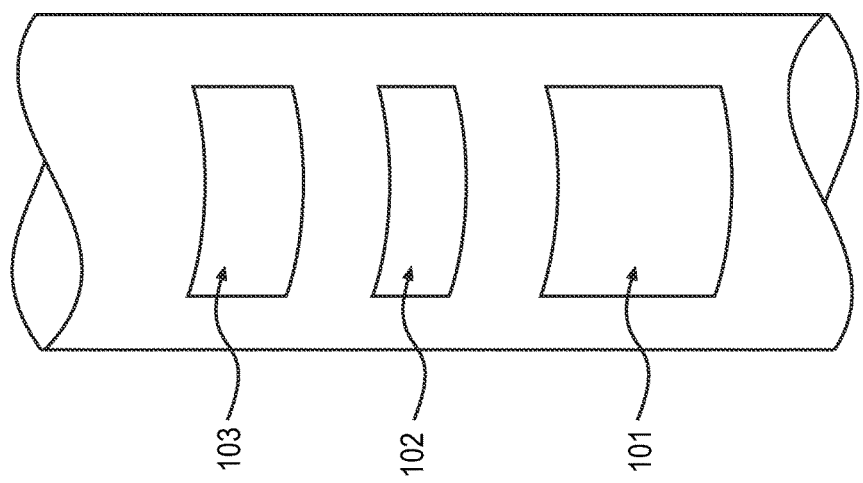
FIG. 4 is a schematic representation of another embodiment of a three-electrode sensor compatible with the systems and methods disclosed herein, wherein the sensor is shown disposed on a bottomhole tool (partially shown).

As a person of skill should appreciate from reading this disclosure, the plurality of electrodes (whether three, four, or more electrodes) may also be arranged in a non-concentric pattern. In either case, there is a primary electrode kept at one potential and multiple secondary electrodes kept at another potential, and the electrodes are positioned relative to one another to provide a unique current flow measurement between each secondary electrode and the primary electrode. In some embodiments, this is achieved as shown in FIGS. 4 and 5, with a linear configuration wherein the primary electrode 101 is positioned at one end of a set of secondary electrodes 102, 103.

Although only a single sensor 50 is shown in FIG. 1, the system may include multiple sensors. In some embodiments, the system includes a pair of sensors. In some embodiments, the system includes two or more pairs of sensors. In some embodiments, the sensors in each pair are positioned 180 degrees apart on the tool. In some embodiments, the sensors in each pair are positioned 180 degrees apart and at the same depth in the borehole. The choice of the number and arrangement of sensors may depend on the desired measurement. For example, a single sensor provides an estimate of standoff. A single sensor may also provide an estimate of caliper or an estimate of the shape of a borehole if multiple measurements are taken as the tool rotates. However, caliper can also be measured by taking simultaneous measurements from a pair of sensors positioned 180 degrees apart and at the same depth. In this way, various configurations of sensors, including providing sensors at different heights on the downhole tool, can provide data useful for estimating size and shape of the borehole.

In operation, a power supply provides alternating current to the sensor. In some embodiments, the power supply provides alternating current of a single excitation frequency to the primary electrode, while the primary electrode is maintained at one potential and the secondary electrodes are maintained at another potential. As shown in FIG. 2, such an arrangement causes a first current $I_1$ to flow between the primary electrode and the first secondary electrode, and a second current $I_2$ to flow between the primary electrode and the second secondary electrode. Similarly, as is shown in FIG. 6, such an arrangement causes a first current $I_1$ to flow between the primary electrode and the first secondary electrode, a second current $I_2$ to flow between the primary electrode and a second secondary electrode, and a third current $I_3$ to flow between the primary electrode and a third secondary electrode. In some embodiments, each of the currents flowing between the primary electrode and a secondary electrode is unique. That is, for example, in FIG. 2, the first current $I_1$ and second current $I_2$ are different, and in FIG. 6, the first current $I_1$, the second current $I_2$, and the third current $I_3$ are all different. In other words, in some embodiments having more than two secondary electrodes, the current flowing between the primary electrode and each secondary electrode is distinct.

In some embodiments, the excitation frequency is chosen, on the one hand, to be sufficiently low such that formation properties can be neglected (i.e. to alleviate or eliminate the impact of formation properties on standoff estimation) and on the other hand is chosen to be sufficiently high that the system can measure the impedance, or is chosen to be sufficiently high that impedance is easily measured. In some embodiments, the excitation frequency is less than 100 kHz. In some embodiments, the excitation frequency ranges from about 1 kHz to less than 100 kHz, or from about 10 kHz to less than 100 kHz. Frequencies of 100 kHz and higher may be used, but in those embodiments it may be desirable to take into account formation properties when estimating standoff from the measured current flows.

In some embodiments, standoff is estimated by simultaneously measuring current flow between the primary electrode and each secondary electrode, calculating a quantity m from the measurements, and correlating the calculated m value with estimated standoff using a predetermined relationship between m and standoff. In some embodiments, currents are measured by recording amplitude. In further embodiments, currents are measured by also recording the in-phase and in-quadrature components of amplitude.

In a three-electrode system, a single quantity m is calculated according to the following equation:

$$m = \left| \frac{I1 + I2}{I2} \right|$$

For sensors including four or more electrodes (i.e. three or more secondary electrodes), a quantity $m_a$ is calculated according to the following equation:

$$ma = \left| \frac{I1 + I2 + \ldots In}{Ia} \right|$$

and wherein "a" identifies the secondary electrode but is greater than 1 (i.e. a can be 2, 3, . . . n).

In some embodiments, $m_a$ is calculated for every secondary electrode greater than 1 (i.e. a>1), and each $m_a$ is correlated with standoff using a predetermined relationship. Thus, for example, for a system having four electrodes, $m_2$, $m_3$ and $m_4$ can be calculated with $I_a$ being $I_2$, $I_3$ and $I_4$ respectively.

Figure 3:
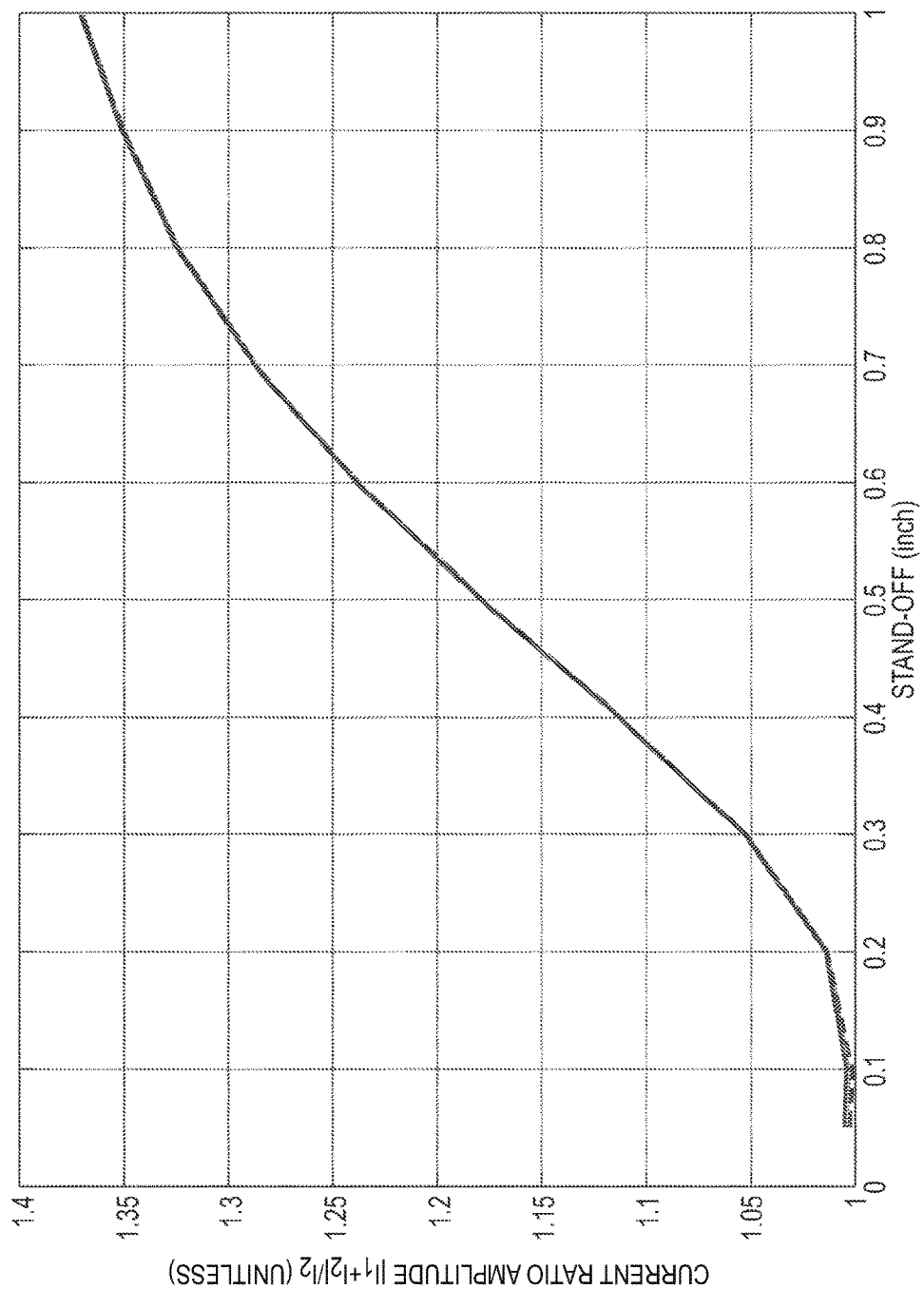
FIG. 3 is a graph which correlates current flow rates with standoff, and which was generated using simulations based on Maxwell's equations.

As shown in FIG. 3 for a three-electrode system, the calculated quantity m can then be correlated to an estimated standoff basis a predetermined relationship between m and standoff. The predetermined relationship illustrated in the graph of FIG. 3 was generated from simulations of Maxwell's equations performed for several standoff values ranging from 0.05 inch to 1 inch, for several mud properties and formation properties, and using an excitation frequency of 10 kHz. A person of skill will appreciate from the disclosure herein that the same calculations can be generalized to a wide range of frequencies. Further, a person of skill will appreciate that for systems having sensors including more than three electrodes, additional $m_a$ measurements can be constructed based on the equations provided herein. If each $m_a$ is provided on the same graph as a function of standoff, each $m_a$ curve will appear slightly offset from another $m_a$ curve along the standoff axis. Further, each $m_a$ curve may show different ranges of standoff where each shows optimal sensitivity. In some embodiments, the use of several $m_a$ measurements enables a better standoff estimation on a wider range.

As is illustrated in FIG. 3, curves corresponding to different formation properties overlay (i.e. the dashed curve and solid curve overlay and other curves are not evident due to the overlap), which means that the created measurement should provide an absolute estimate of the electric standoff, regardless of perturbing parameters such as mud and formation electrical properties. FIG. 3 also demonstrates that the measurement used appears as a ratio, thus compensating naturally for electronics drifts and calibrations (if current measurements are performed by equivalent electronic circuits). FIG. 3 also indicates that the zone of maximum sensitivity to standoff depends on electrode sizes, suggesting that more electrodes can be added to the sensor in order to obtain a wider range of standoff estimation.

A number of embodiments have been described. Nevertheless it will be understood that various modifications may be made without departing from the spirit and scope of the invention. Accordingly, other embodiments are included as part of the invention and may be encompassed by the attached claims. Furthermore, the foregoing description of various embodiments does not necessarily imply exclusion. For example, "some" embodiments or "other" embodiments may include all or part of "some", "other" and "further" embodiments within the scope of this invention.

What is claimed is:
1. A system, comprising:
a. a downhole tool positionable in a borehole;
b. at least one sensor disposed on the tool, the at least one sensor comprising: a primary electrode and two or more secondary electrodes, wherein the electrodes are arranged to provide a distinct current measurement between the primary electrode and each secondary electrode when the system is in operation; and,
c. an electronics subsystem comprising a controller and a processor and including machine-readable instructions for: exciting the primary electrode with a single frequency and maintaining the primary electrode at a first potential and the secondary electrodes at a second potential different from the first potential; simultaneously measuring current flow through each secondary electrode; and estimating a standoff between the tool and the borehole, a borehole caliper, or both from the current flow measurements, wherein the estimation comprises calculating a value of a ratio ma associated to a $a^{th}$ secondary electrode according to the formula:

$$ma = \left| \frac{I1 + \ldots + In}{Ia} \right|,$$

wherein n identifies the number of electrodes, "a" identifies the secondary electrode and is greater than 1,
wherein I1 is the current flowing between the primary electrode and the first secondary electrode, I2 is the current flowing between the primary electrode and the second secondary electrode, In is the current flowing between the primary electrode and the $n^{th}$ secondary electrode, Ia is the current flowing between the primary electrode and the $a^{th}$ secondary, and wherein the estimation further includes correlating the value ma to the standoff in view of a calibration curve.

2. The system according to claim 1, wherein the electrodes are arranged in a concentric pattern and the primary electrode is centered in the pattern.

3. The system according to claim 1, wherein the electrodes are arranged in a non-concentric pattern and the primary electrode is positioned at one end of the pattern.

4. The system according to claim 1, wherein the at least one sensor is at least two sensors, further wherein a first sensor of the at least two sensors and a second sensor of the at least two sensors are positioned at the same height on the tool about 180 degrees apart.

5. The system according to claim 1, wherein the downhole tool has a diameter and the at least one sensor is a first sensor and a second sensor, and the electronics subsystem estimates the borehole caliper by summing a first standoff estimated from measuring current flow through the first sensor with a second standoff estimated from measuring current flow through the second sensor taking into account the downhole tool diameter.

6. The system according to claim 1, wherein the tool is a logging while drilling tool or a measurement while drilling tool.

7. A method, comprising:
   a. positioning a downhole tool having at least one sensor disposed thereon in a borehole, wherein the at least one sensor comprises a primary electrode and two or more secondary electrodes;
   b. applying a single exciting frequency to the primary electrode while maintaining the primary electrode at a first potential and the secondary electrodes at a second potential different from the first potential;
   c. simultaneously obtaining measurements of current flow between the primary electrode and each secondary electrode; and
   d. estimating a standoff between the tool and the borehole, a borehole caliper, or both from the measurements, wherein the estimation comprises calculating a value of a ratio ma associated to a $a^{th}$ secondary electrode according to the formula:

$$ma = \left| \frac{I1 + I2 + \ldots In}{Ia} \right|,$$

wherein n identifies the number of electrodes, "a" identifies the secondary electrode and is greater than 1,
wherein I1 is the current flowing between the primary electrode and the first secondary electrode, I2 is the current flowing between the primary electrode and the second secondary electrode, In is the current flowing between the primary electrode and the $n^{th}$ secondary electrode, Ia is the current flowing between the primary electrode and the $a^{th}$ secondary electrode, and wherein the estimation further includes correlating the value ma to the standoff in view of a calibration curve.

8. The method according to claim 7, wherein step d comprises estimating the caliper from measurements of current flow in a first sensor and a second sensor that are positioned at the same height on the tool about 180 degrees apart from each other.

9. The method according to claim 7, wherein the excitation frequency ranges from about 1 kHz to less than 100 kHz.

10. The method according to claim 7, wherein the electrodes are arranged in a concentric pattern with the primary electrode centered in the pattern or in a non-concentric pattern with the primary electrode positioned at one end of the pattern.

11. The method according to claim 7, wherein the standoff, the caliper, or both are measured while drilling.

12. The system of claim 1, wherein at least two of the secondary electrodes are of an identical size.

* * * * *